United States Patent
Opitz et al.

(10) Patent No.: US 6,901,355 B2
(45) Date of Patent: May 31, 2005

(54) METHOD FOR CORRECTING NON-LINEARITIES OF AN OUTPUT SIGNAL OF AN ELECTRICAL COMPONENT, PARTICULARLY A MEASURING TRANSDUCER

(75) Inventors: Bernhard Opitz, Leonberg (DE);
Thomas Wieja, Gomaringen (DE)

(73) Assignee: Robert Bosch GmbH, Stuttgart (DE)

( * ) Notice: Subject to any disclaimer, the term of this patent is extended or adjusted under 35 U.S.C. 154(b) by 79 days.

(21) Appl. No.: 10/357,713

(22) Filed: Feb. 4, 2003

(65) Prior Publication Data

US 2003/0163270 A1 Aug. 28, 2003

(30) Foreign Application Priority Data

Feb. 4, 2002 (DE) .......................................... 102 04 442

(51) Int. Cl.[7] .............................................. G06F 15/00
(52) U.S. Cl. ...................................... 702/190; 708/304
(58) Field of Search ................................. 341/118, 120, 341/155, 143; 375/242, 247; 702/66, 70–71, 73, 85–86, 189–190, 193, 196–197; 708/290–300, 304, 307, 313; 701/1, 51–56, 70, 96, 103–105; 324/607

(56) References Cited

U.S. PATENT DOCUMENTS

| | | | | |
|---|---|---|---|---|
| 5,442,918 A | * | 8/1995 | Baeuerle et al. | 60/602 |
| 5,592,165 A | * | 1/1997 | Jackson et al. | 341/143 |
| 6,253,748 B1 | * | 7/2001 | Engel et al. | 123/568.21 |
| 6,340,940 B1 | * | 1/2002 | Melanson | 341/143 |
| 6,377,884 B1 | * | 4/2002 | Loeffler et al. | 701/54 |
| 6,434,465 B2 | * | 8/2002 | Schmitt et al. | 701/53 |
| 6,652,417 B2 | * | 11/2003 | Iriyama | 477/111 |
| 6,701,897 B2 | * | 3/2004 | Chatfield | 123/438 |

FOREIGN PATENT DOCUMENTS

| | | |
|---|---|---|
| DE | 42 03 879 | 8/1992 |
| DE | 296 12 638 | 10/1996 |
| DE | 197 13 786 | 10/1998 |
| DE | 198 46 461 | 4/1999 |
| DE | 693 27 806 | 10/2000 |
| DE | 199 33 665 | 1/2001 |

OTHER PUBLICATIONS

P.D. Wilson et al: "Universal sensor interface chip (USIC): specification and applications outline", *Sensors Review*, vol. 16, Nr. 1, 1996, S. 18–21.

B.J. Hosticka: "CMOS Sensor Systems", *Sensors and Actuators*, A66 (1998), pp. 335–341.

\* cited by examiner

*Primary Examiner*—Marc S. Hoff
*Assistant Examiner*—Mary Catherine Baran
(74) *Attorney, Agent, or Firm*—Kenyon & Kenyon

(57) ABSTRACT

A method for correcting non-linearities of an output signal of an electrical component with the aid of a characteristics map that is defined by discrete interpolation points. In this context, the adjacent interpolation points of the characteristics map are ascertained as a function of at least one signal influencing the non-linearities of the output signal. Interpolation is carried out between these interpolation points, and a corresponding correction signal is ascertained as a function of the or each signal by an interpolation. The output signal of the electrical component is corrected as a function of the correction signal. To improve the correction of non-linear transfer characteristics and/or temperature responses of the electrical component, it is proposed that the or each signal for addressing the characteristics map be high-pass filtered, and the correction signal be ascertained as a function of the or each signal by the interpolation and a subsequent low-pass filtering.

15 Claims, 6 Drawing Sheets

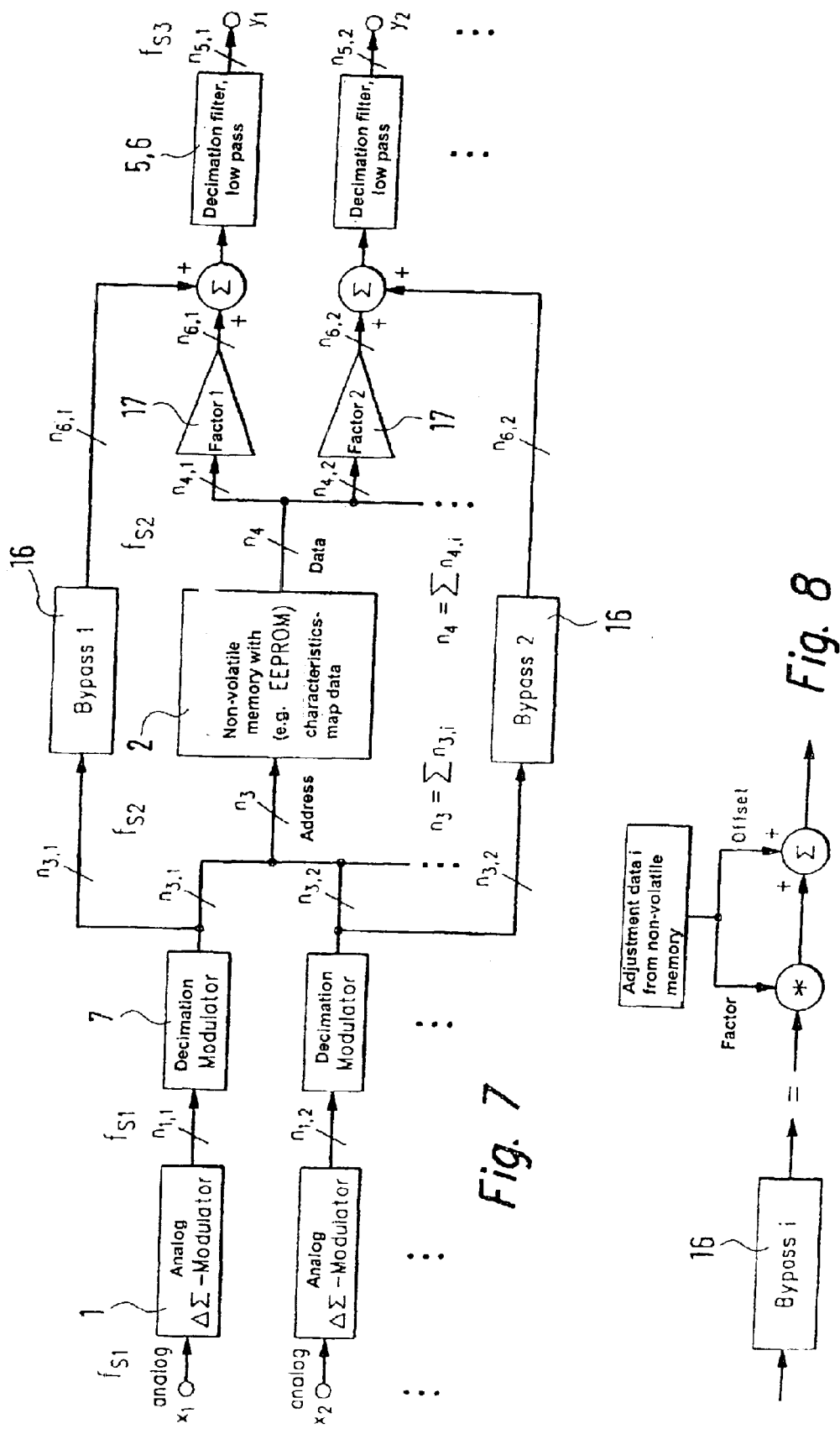

METHOD FOR CORRECTING NON-LINEARITIES OF AN OUTPUT SIGNAL OF AN ELECTRICAL COMPONENT, PARTICULARLY A MEASURING TRANSDUCER

FIELD OF THE INVENTION

The present invention relates to a method for correcting non-linearities of an electrical output signal of an electrical component, such as, for example, a measuring transducer, with the aid of a characteristics map, stored for example, in a characteristics-map memory, that is defined by discrete interpolation points. In this context, the adjacent interpolation points of the characteristics map are ascertained as a function of at least one analog signal influencing the non-linearities of the output signal, and an interpolation is carried out between these interpolation points to ascertain an output signal of the characteristics map. The or each signal for addressing the characteristics map is A/D converted by a delta-sigma modulator.

The present invention also relates to a digital sensor evaluation circuit of an electrical component, such as, for example, a measuring transducer for correcting non-linearities of an electrical output signal of the component. The evaluation circuit includes

- a characteristics-map memory in which discrete interpolation points of a characteristics map are stored,
- means for acting upon characteristics map by addressing the characteristics-map memory using at least one signal influencing the non-linearities of the output signal,
- a delta-sigma modulator for the A/D conversion of the or each signal prior to acting upon the characteristics map using the or each signal,
- means for ascertaining the adjacent interpolation points of the characteristics map as a function of the at least one signal influencing the non-linearities of the output signal,
- means for ascertaining an output signal of the characteristics map as a function of the or each signal by an interpolation between the interpolation points, and
- means for correcting the output signal of the component as a function of the output signal of the characteristics map.

Moreover, the present invention relates to a measuring transducer for converting chemical or physical quantities, detected by a sensor, into electrical an electrical output signal, having a digital sensor evaluation circuit for correcting no-linearities of the output signal. The evaluation circuit includes:

- a characteristics-map memory in which discrete interpolation points of a characteristics map are stored,
- means for acting upon the characteristics map by addressing the characteristics-map memory using at least one signal influencing the non-linearities of the output signal,
- a delta-sigma modulator for the A/D conversion of the or each signal prior to acting upon the characteristics map using the or each signal,
- means for ascertaining the adjacent interpolation points of the characteristics map as a function of the at least one signal influencing the non-linearities of the output signal,
- means for ascertaining an output signal of the characteristics map as a function of the or each signal by an interpolation between the interpolation points, and
- means for correcting the output signal of the component as a function of the output signal of the characteristics map.

Finally, the present invention also relates to a computer program which is executable on a computing element, particularly on a microprocessor.

BACKGROUND INFORMATION

Sensors supply information about measurable physical or chemical (mostly non-electrical) quantities to control units in automobile applications, in industrial installation controls or in medical technology applications. Measuring transducers convert the measured quantities into electrical quantities (voltage, current, resistance, capacitance, frequency, etc.). As a rule, the conversion is subject to relatively large manufacturing tolerances of the measuring transducer and non-ideal situations such as, for example, temperature responses. In addition, the electrical quantities are typically very small and therefore not suitable for transmitting directly to a control unit. That is why, mounted at the measuring transducer is a signal evaluation circuit which conditions the electrical signal and routes it via an analog or digital interface to the control unit. This signal evaluation circuit is able to correct, for example, sensitivity, offset and temperature response in a part-specific manner. The data necessary for this purpose are stored in a non-volatile memory.

Such sensor evaluation circuits are increasingly designed as application-specific integrated circuits (so-called ASICs). Purely analog evaluation circuits with D/A (digital/analog) converters for the coefficients are customary. Digital evaluation circuits are also being used with increasing frequency, in which the electrical signal (with or without analog pre-corrections, for example, of the offset) is A/D (analog/digital)-converted and then subjected to digital signal corrections. Since the typical limiting frequencies of the measured quantities often lie below one kilohertz, but high demands are placed on the resolution of the sensors, the use of a so-called delta-sigma converter (delta-sigma modulator or sigma-delta modulator) presents itself for the A/D conversion of the electrical equivalent parameters which play a key role in such a system. This holds true in particular for modern IC processes, in which the component :density of digital circuits and the achievable switching speeds are increasing, while the analog qualities of the components are more likely decreasing. An example for a digital sensor evaluation circuit based on delta-sigma converters is known, for example, from the German Patent 100 34 813.

Furthermore, when working with measuring transducers having non-linear transfer characteristics and/or temperature responses, non-linear corrections in the evaluation circuit may also become necessary. Here, characteristics-map adjustments offer the greatest degree, of freedom. This is elucidated using a two-dimensional characteristics map shown in FIG. 2 as example: There, a physical measured quantity $y\_1$ is dependent on two signals $x\_1$ and $x\_2$ by way of a non-linear function $y\_1=f(x\_1, x\_2)$. For example, $x\_1$ could be an output signal of a measuring bridge and $x\_2$ could be a temperature signal. The grid points of the curved plane, described by function $f(x\_1, x\_2)$ in FIG. 2, may be stored in a characteristics-map memory. For each concrete measured-value pair $(x\_1, x\_2)$, which generally lies between these grid points, the evaluation circuit must then undertake an interpolation with the four surrounding grid points as interpolation points, in order to ascertain an approximatively correct output value. The denser the interpolation points and the smaller the curve of the function in the respective direction, the more precise the interpolation becomes. For this reason, in FIG. 2, for example, the interpolation point density in direction $x\_2$ is selected to be less than in direction $x\_1$. In principle, the dimension of the characteristics map, thus, the number of input quantities $x\_i$, is arbitrary, but often the cases occur one-dimensionally (so-called characteristic curve) and two-dimensionally.

The interpolation is accomplished with the four surrounding grid points of the characteristics map, often by the use of arithmetic-logic units. Thus, a microprocessor having suitable software, a digital signal processor (so-called DSP) or a special RISC (reduced instruction set computing)-processor may be used. However, often the costs associated with the implementation of such processor design approaches are not acceptable, particularly when using processes that employ less densely packed ICs, which, for instance, are used for applications in motor vehicles because of demands on the dielectric strength and reliability.

Another widely prevalent approach for non-linear corrections in the evaluation circuit is derived directly from a customary linear adjustment. In the linear case, signals are multiplied by coefficients, established in the adjustment procedure, and summed. For a non-linear adjustment, the coefficients may also come from a characteristics-map memory which is addressed as a function of signal and/or temperature. However, when working with a finite number of interpolation points, this leads to (mostly unwanted) sudden changes in the output signal when the addressing signal passes the interpolation points. Here, the use of oversampling methods may provide a remedy. In B. J. Hosticka: *"CMOS Sensor Systems"*, Sensors and Actuators A66 (1998), pp. 335–341, particularly p. 340, an oversampled temperature signal is used for addressing a characteristics map, which supplies coefficients for an analog signal-evaluation channel. The bandwidth of this analog channel is so low that a large part of the quantization noise of the interpolation-point quantization is filtered out again.

SUMMARY OF THE INVENTION

An object of the present invention is to improve the correction of non-linear transfer characteristics and/or temperature responses of electrical components, particularly measuring transducers. In the case of non-linear correction with the aid of a characteristics map, an interpolation between interpolation points of the characteristics map may be provided in a simpler, more cost-effective and more robust manner.

To achieve this objective, the present invention proposes, starting from the method for correcting non-linearities of the type indicated at the outset, that the or each signal be oversampled by the delta-sigma modulator, a quantization noise in the or each signal being shifted by the delta-sigma modulator out of a signal-frequency range toward higher frequencies; and the characteristics-map memory containing the characteristics map is addressed by an output signal of the delta-sigma modulator, a noise of the or each signal on the basis of the quantization noise being utilized for the interpolation between the interpolation points of the characteristics map.

As a further design approach for achieving the objective of the present invention, it is proposed, starting from the sensor evaluation circuit of the type indicated at the outset, that the delta-sigma modulator oversample the or each signal and shift a quantization noise in the or each signal out of a signal-frequency range toward higher frequencies; and that the sensor evaluation circuit address the characteristics-map memory using an output signal of the delta-sigma modulator, the interpolation between the interpolation points of the characteristics map being effected with the aid of a noise of the or each signal on the basis of the quantization noise.

Finally, as a still further design approach for achieving the objective of the present invention, it is proposed, starting from the measuring transducer of the type indicated at the outset, that the delta-sigma modulator oversample the or each signal and shift a quantization noise in the or each signal out of a signal-frequency range toward higher frequencies; and that the sensor evaluation circuit address the characteristics-map memory using an output signal of the delta-sigma modulator, the interpolation between the interpolation points of the characteristics map being effected with the aid of a noise of the or each signal on the basis of the quantization noise.

According to the invention, the correction of non-linear transfer characteristics and/or temperature responses of measuring transducers is consequently expanded to purely digital characteristics mappings of any dimension. The essence of the invention is the addressing of the characteristics-map memory using oversampled signals which have experienced noise forming with a high-pass characteristic by the use of delta-sigma modulators. After the characteristics mapping, a large part of the quantization noise may be removed again from the output signal by low-pass filtering. This may be equated with an interpolation via the adjacent interpolation points. A part of the noise forming necessary for this method is supplied by the use of delta-sigma modulators as A/D converters for the input signals. If this is not sufficient because of restrictions in the modulator order, in the number of interpolation points and in the memory access rate, then a highly efficient integration of a decimation filter and a digital delta-sigma modulator may be used. With the aid of a decimation filter, the sampling rate may be changed while avoiding aliasing effects. In the present case, the decimation filter is used for reducing the sampling rate, in order to reduce the hardware and computing expenditure for: the non-linear correction. The size of the characteristics map may be further reduced through the separate treatment of linear adjustment components by the use of linear bypass circuits.

The advantages of the present invention compared to part-analog design approaches lie in the absolute drift stability of the digital part, the improved utilization of modem IC processes, and in the improved testability. The advantage compared to processor-based design approaches is the lower area outlay in the case of moderately densely packed IC processors, as are used particularly in motor-vehicle applications. Implementing the method of the present invention in the form of a computer program for a computer is particularly important. The computer program is executable on a computing element, particularly on a microprocessor, and is suitable for carrying into effect the method according to the present invention. The computer program represents the invention in the same way as the method, for whose execution the computer program is suitable. The computer program is preferably stored on a memory element for a computer. In particular, an electrical, magnetic and/or optical storage medium, e.g. a read-only memory, a random-access memory, a flash memory, a diskette, a compact disc (CD) or the like may be used as memory element.

BRIEF DESCRIPTION OF THE DRAWINGS

FIG. 7 shows a block diagram of a measuring transducer according to the invention with a characteristics-map adjustment of an N-dimensional, M-fold characteristics map according to a third preferred specific embodiment.

FIG. 8 shows a block diagram of a bypass of the measuring transducer from FIG. 7.

DETAILED DESCRIPTION

Figure 1:
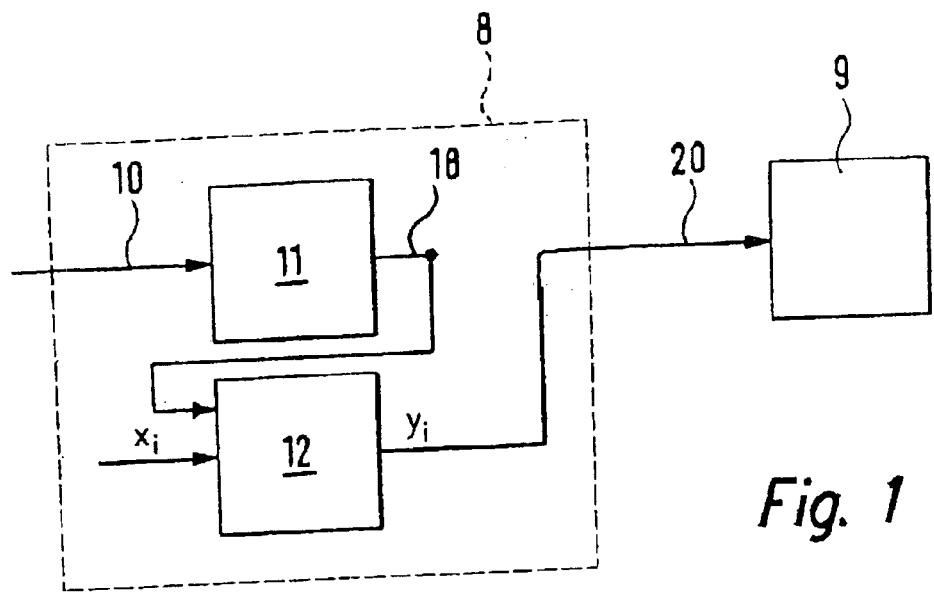
FIG. 1 shows an example for a possible use of the present invention in a measuring transducer of a sensor.

In FIG. 1, a sensor is designated by reference numeral 8. Sensor 8 supplies, for example, information about measurable physical or chemical (mostly non-electrical) quantities 10 to a control unit 9 in automobile applications, in industrial installation controls or in medical technology applications. A measuring transducer 11 converts measured quantities 10 into electrical quantities (voltage, current, resistance, capacitance, frequency, etc.) 18. As a rule, the conversion is subject to relatively large production tolerances of measuring transducer 11 and non-ideal situations such as temperature responses. In addition, electrical quantities 18 are typically very small and therefore not suitable for transmitting directly to control unit 9. That is why, provided at measuring transducer 11 is a signal-evaluation circuit 12 which conditions electrical signal 18 and routes conditioned signal 20 via an analog or digital interface to control unit 9. This signal-evaluation circuit 12 is able to correct, for example, sensitivity, offset and temperature response in a part-specific manner. Evaluation circuit 12 ascertains a correction value $y\_i$ which corresponds to conditioned output signal 20.

Figure 3:
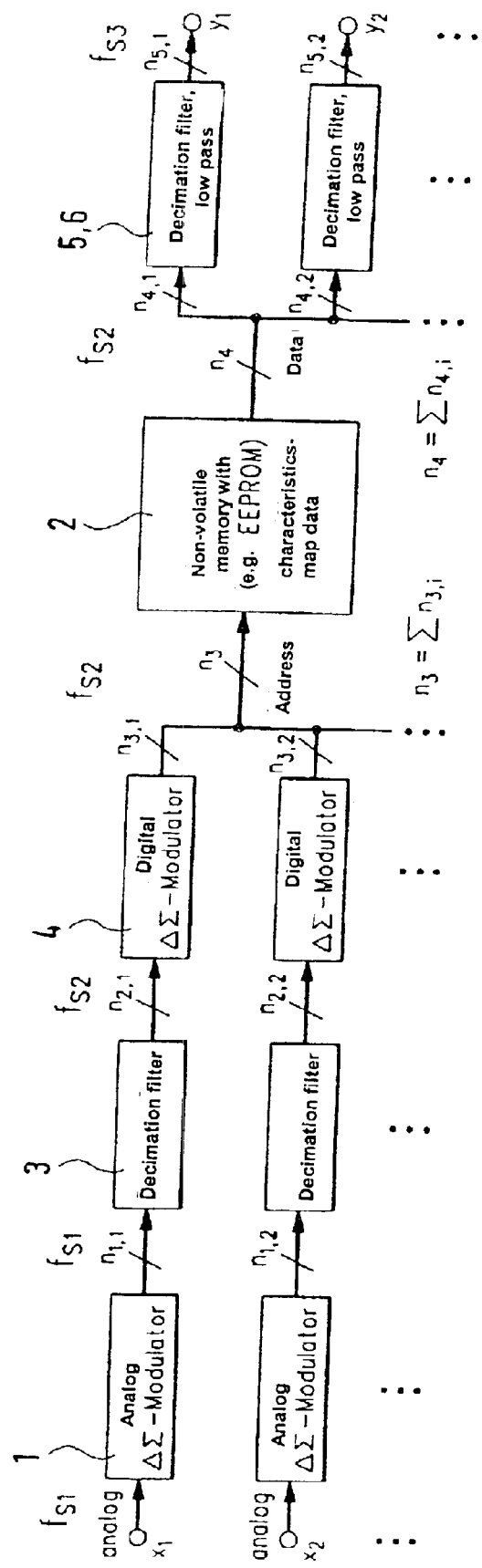
FIG. 3 shows a block diagram of a measuring transducer according to the invention with a characteristics-map adjustment of an N-dimensional, M-fold characteristics map according to a first preferred specific embodiment.

FIG. 3 shows the basic construction of a signal evaluation circuit 12 according to the invention for a measuring transducer 11 in the case of an M-fold, N-dimensional characteristics mapping with analog input signals $x\_1, \ldots, x\_N$ (represented up to N=2) and output signals $y\_1, \ldots, y\_M$ (represented up to M=2). Input signals $x\_1, \ldots, x\_N$ are analog electrical quantities which come from measuring transducer 11. Input signals $x\_i$ are signals which influence the non-linearities of output signal 18 of measuring transducer 11. In the exemplary embodiment shown in FIG. 1, electrical quantity 18 at the output of measuring transducer 11 is also one of input signals $x\_i$. It is thereby possible to ascertain a correction value $y\_i$ as a function of electrical quantity 18. A further example for an input quantity $x\_i$ is, for instance, a temperature (e.g. the ambient temperature or the temperature of the medium or component part whose physical or chemical quantity 10 was measured).

Output signals $y\_1, \ldots, y\_M$ are analog or digital electrical quantities which may be supplied to control unit 9 via any analog or digital interfaces. The designations $n\_kj$ indicate the word lengths of the respective fixed-decimal-point digital signals, k designating the position from left to right in the signal flow and j designating the specific channel $(1, \ldots, N$ at the input and $1, \ldots, M$ at the output). Between the blocks, the respective sampling frequencies $f\_S1, \ldots, f\_S3$ are indicated, no differentiation being made according to channels for the sake of simplicity. Actually, however, frequencies $f\_S1$ and $f\_S3$ may be selected in a channel-specific manner, in order to ensure ideal adaptation to the resolution and limiting-frequency conditions of the respective channels. Merely in the case of $f\_S2$ is only one fixed sampling rate possible, namely, an access rate to a characteristics-map memory 2.

Input signals $x\_i$ are converted by A/D (analog/digital) converters 1 into digital signals having word lengths $n\_1,i$ at the rate of $f\_S1$. Here, low-pass delta-sigma converters are preferably used, because they already carry out a high-pass noise forming of their quantization noise. $n\_1,i$ is typically equal to 1. Correspondingly, $f\_S1$ must be selected to be large compared to the required system bandwidth, in order to ensure oversampling sufficient for a required resolution. $f\_S1$ lies typically approximately in the area of factor 100 of the minimal sampling rate. As a rule, the oversampling is easily attainable in the sensor suite, since the signal bandwidths are more likely low there.

Typically, actual characteristics map 13 is stored in a non-volatile memory 2, for instance, an EEPROM (electronically erasable programmable read-only memory) to permit the adjustment of measuring transducer 11. The adjustment is preferably carried out at the end of sensor production. To store characteristics map 13, instead of non-volatile memory 2, a volatile memory, for instance, a RAM (random-access memory) may be used, whose contents are downloaded into sensor 8 after each switch-on of the energy supply of control unit 9. Since the method of the present invention lives from the oversampling of signals, a highest possible access rate $f\_S2$ to characteristics-map memory 2 is desirable. However, this rate is technically limited. That is why a reduction of the sampling rate from $f\_S1$ to $f\_S2$ is necessary when using low-order delta-sigma A/D converters 1. This may be implemented, as shown in FIG. 3, using a decimation filter 3 for avoiding aliasing effects. In this context, the word length is increased from $n\_1,i$ to $n\_2,i$.

The number of interpolation points of the dimension i is adapted to the non-linearity of the characteristics mapping to be displayed. Word length $n\_2,i$ should be adapted to the number of interpolation points. $2^{n\_2,i}$ is markedly greater than the desired number of interpolation points. Rather, a word length $n\_3,i$ is useful, which is equal to the next-larger integer value than the logarithm to base 2 of the number of interpolation points specified. As a rule, this number is selected as the 2nd exponent, to efficiently utilize memory 2. However, other values may likewise be easily realized by the use of limiter circuits. To come down from $n\_2,i$ to $n\_3,i$, first of all, a simple rounding-off is conceivable. However, this leads to unformed, approximatively white quantization noise which can no longer be separated from the useful signal in the signal band. Thus, as a rule, the resolution demands cannot be met.

A better possibility is a word-length reduction with high-pass noise forming in a digital delta-sigma modulator 4.

Alternatively, delta-sigma A/D converter 1 may of course also be implemented at a higher order right at the outset.

Figure 2:
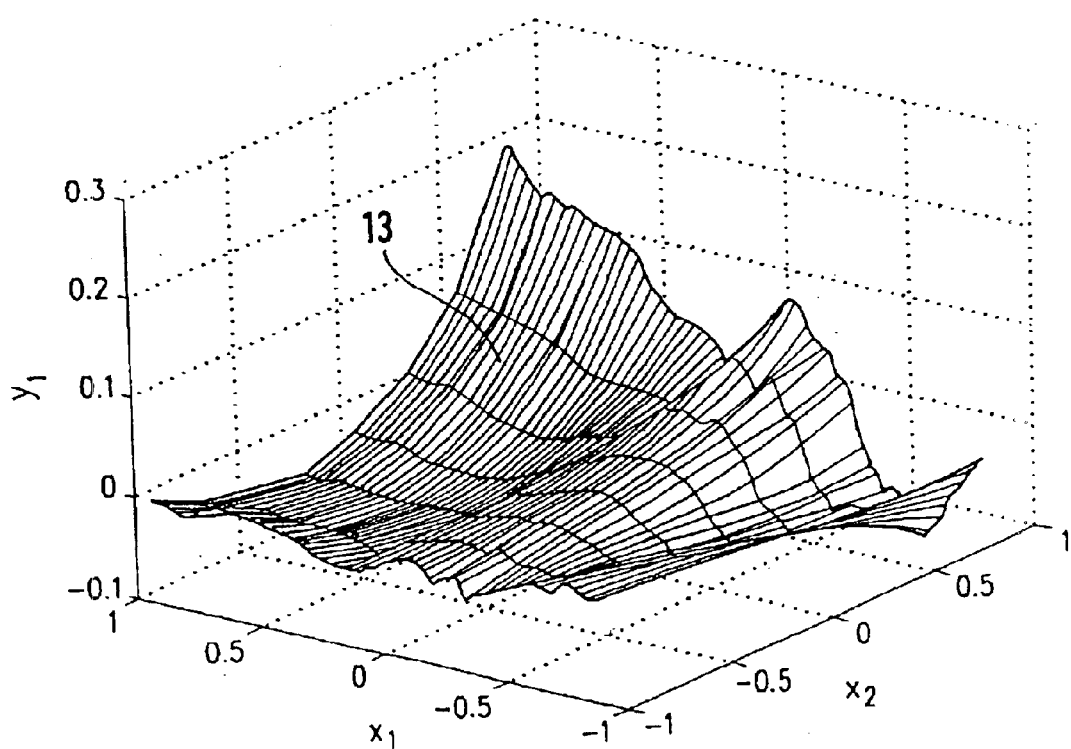
FIG. 2 shows a two-dimensional characteristics map.

In the case of an N-dimensional characteristics mapping, one now has available N digital signals of the word lengths $n\_3,i$ with the data rate $f\_S2$. In a simple bit-by-bit joining operation, these data may be converted into $n\_3$ bit long addresses of characteristics-map memory 2. Suitable filing of the data in this memory 2 ensures that the correct characteristics-map data are made available for each interpolation-point combination, thus for each address (see also FIG. 2). Depending on the required resolution of the characteristics-map data and depending on the number M of the individual characteristics maps, which are queried by a single access of the rate $f\_S2$, an address logic must query a plurality of successive words from memory 2 for each address. This means that one or more bits of the lowest significance must still be added to the address word of length $n\_3$ in order to obtain the actual memory address.

Ultimately, data of the word length $n\_4$ are available at the output of characteristics-map memory 2 at the rate $f\_S2$. They may now be split into M individuals signals of word lengths $n\_4,j$. If a value $x\_i$ lies between two interpolation points (see FIG. 2), the oversampling with noise forming leads to the quasi-random change of the address between adjacent interpolation points, the time average describing the exact value $x\_i$. At the output of characteristics-map memory 2, the data change in the same manner over time between the values of characteristics maps 13 which are allocated to these interpolation points. Here, the time average indicates a value interpolated between the interpolation points. The amplitude of the noise about the value $x\_i$ in units of interpolation points is a function of the order of the noise-forming used. Thus, higher-order interpolations are also possible. The time-averaging which brings about the interpolation may be carried out using low-pass filters 5 downstream of characteristics-map memory 2. As a rule, here one will once again reduce the sampling rate from $f\_S2$ to $f\_S3$, as well, for which further decimation filters 6 are needed.

An important aspect of the present invention is that the word length of characteristics-map data $n\_4,j$ is selected to be typically higher than would be necessary for the representation of the resolution in the case of the oversampling given by $f\_S2$ in comparison to the signal bandwidth. This is necessary in order to ensure the desired accuracy of the adjustment.

From the description of the method according to the invention, it becomes clear that it assumes the selection of equidistant interpolation points; the number of interpolation points in each dimension i may be selected independently of one another. However, the interpolation points for each of the M individual characteristics maps are of necessity the same; only the characteristics-map data for these interpolation points differ. An essential point in the dimensioning is the correlation between the attainable resolution for a given characteristics-map size, and the degree of non-linearity of the characteristics mapping. Due to this non-linearity, noise components from higher frequency ranges are mirrored into the wanted band. These effects are only ascertainable by numerical simulation. So-called pattern noise effects have a particularly disturbing effect here. In this connection, the use of so-called dithering techniques in digital delta-sigma modulator 4 may be considered.

There is a very efficient hardware-saving method for implementing decimation filter 3 and digital delta-sigma modulator 4 upstream of characteristics-map memory 2.

Figure 4A:
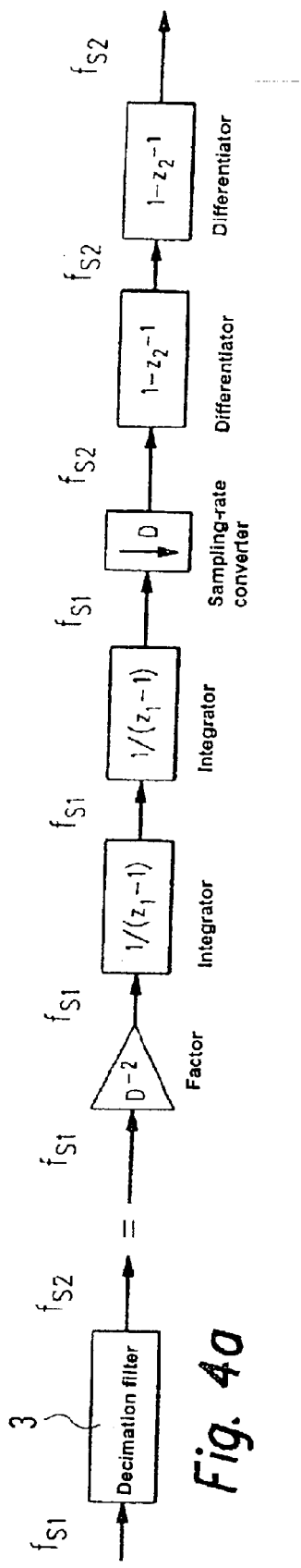
FIG. 4a shows a block diagram of a decimation filter of the measuring transducer from FIG. 3.
Figure 4B:
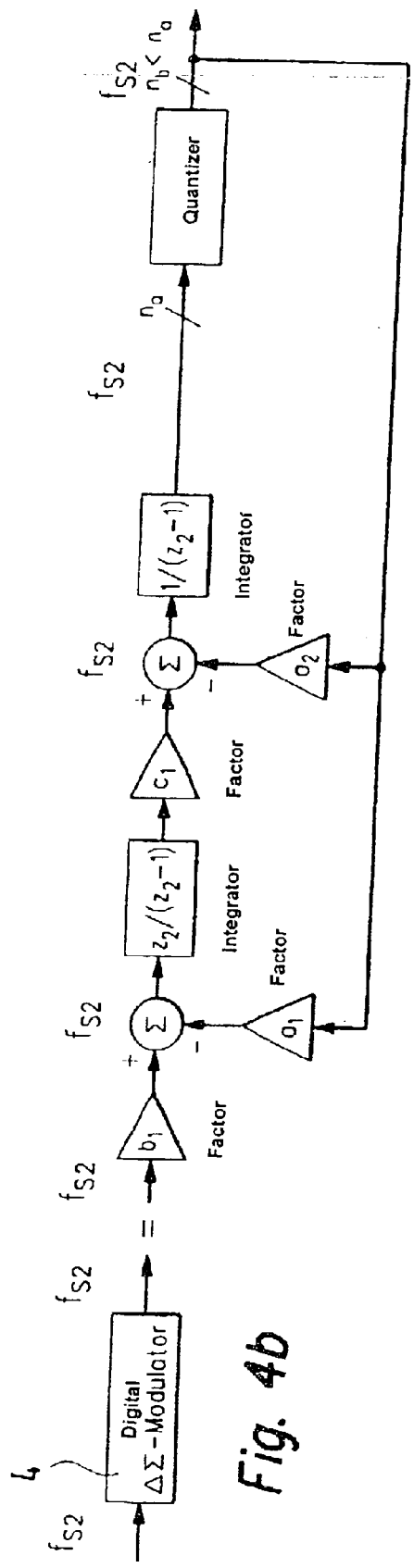
FIG. 4b shows a block diagram of a digital delta-sigma modulator of the measuring transducer from FIG. 3.

FIG. 4a shows the typical architecture of a so-called $sinc^2$ decimation filter. In this context, $z\_i=exp(j*2*pi*f/f\_Si)$ designates the spectral variable of the z-transformation for specific sampling range i. D indicates decimation factor $f\_S1/f\_S2$. A typical implementation of a digital $n\_b$-bit 2nd-order delta-sigma modulator 2 having loop parameters $a\_1, a\_2, b\_1$ and $c\_1$ is given in FIG. 4b. In this case, the quantizer may be realized by the simple dropping of low-significance bits. The loop parameters are represented using the csd form, from a few shifting and addition operations.

Figure 5:
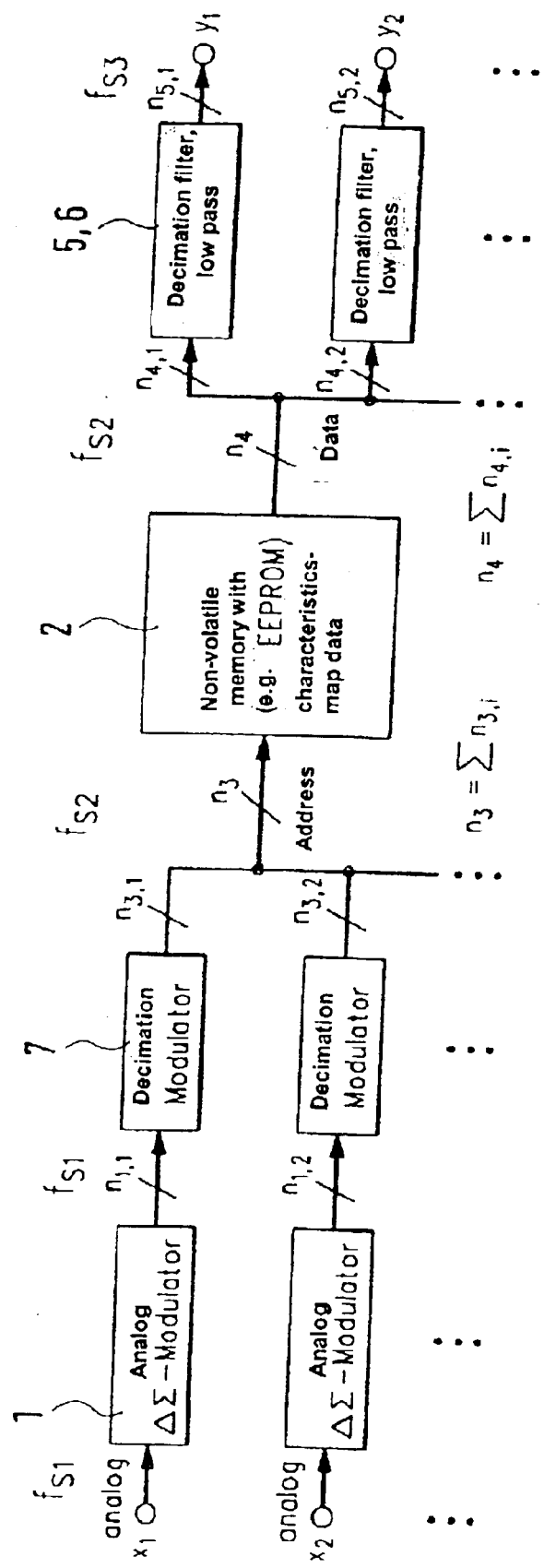
FIG. 5 shows a block diagram of a measuring transducer according to the invention with a characteristics-map adjustment of an N-dimensional, M-fold characteristics map according to a second preferred specific embodiment.

FIG. 5 shows the basic structure of a signal-evaluation circuit 12, according to the present invention, of a measuring transducer 11 in the case of an M-fold, N-dimensional characteristics mapping with analog input signals $x\_1, \ldots, x\_N$ (represented up to N=2) and output signals $y\_1, \ldots, y\_M$ (represented up to M=2) according to an alternative specific embodiment. In this case, the characteristics mapping is carried out using a decimation modulator 7, instead of decimation filter 3 and digital delta-sigma modulator 4 as for measuring transducer 11 from FIG. 3. Possible block diagrams of decimation modulator 7 are shown in FIGS. 6a and 6b.

Figure 6A:
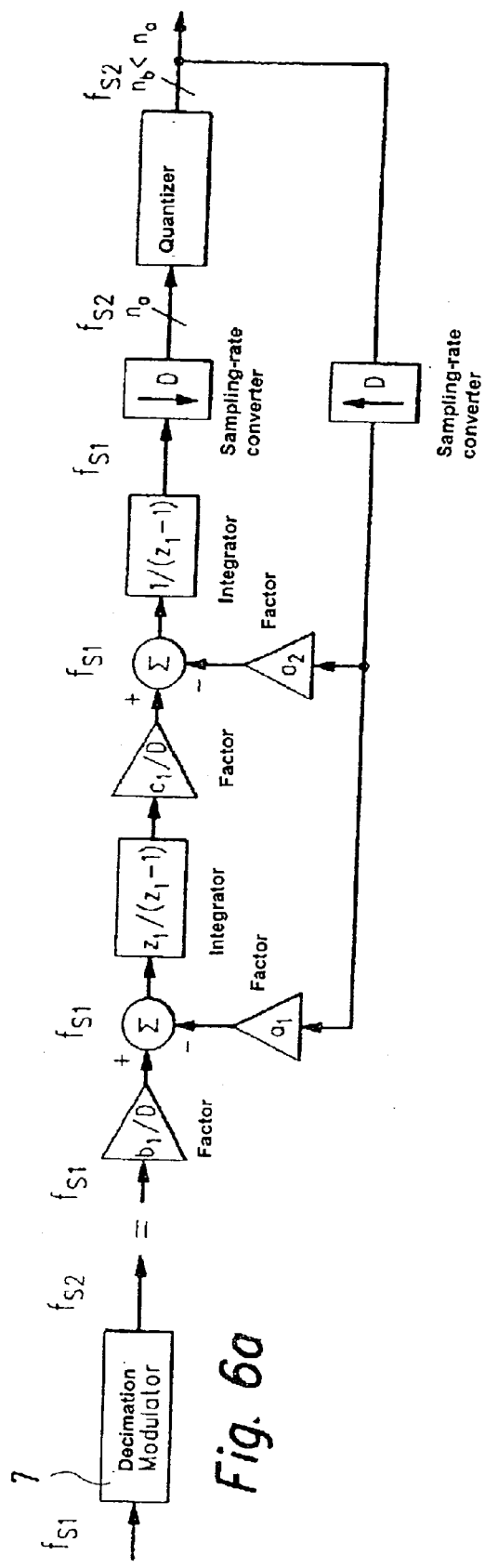
FIG. 6a shows a block diagram of a decimation modulator of the measuring transducer from FIG. 5 according to a first preferred specific embodiment.
Figure 6B:
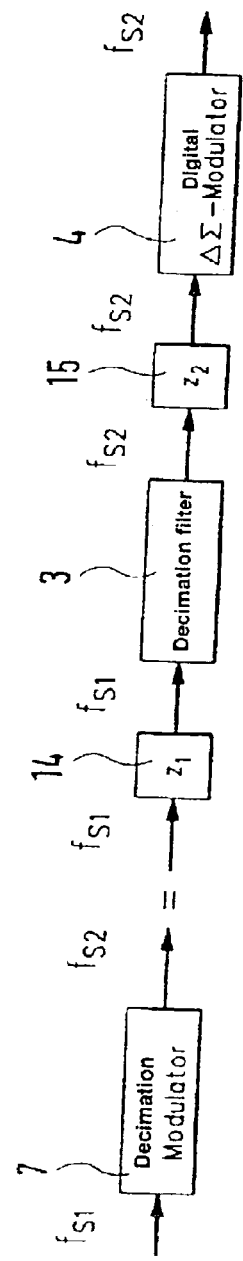
FIG. 6b shows a block diagram of a decimation modulator of the measuring transducer from FIG. 5 according to a second preferred specific embodiment.

FIG. 6a shows a 2nd order decimation modulator. Using the Shannon theorem, one is able to show that both the signal-transmission function and the noise-transmission function of this decimation modulator 7 are equal to the series connection, depicted in FIG. 6b, of decimator 3 and digital delta-sigma modulator 4 according to FIGS. 4a and 4b. Because of the strong non-linearity of the quantization operation, the function must be checked by numerical simulations. Such simulations confirm the equivalence postulated in FIG. 6b. Both blocks 14, 15 in FIG. 6b with transfer functions $z\_1$ and $z\_2$ represent merely negative delays, which means that the group running time through decimation modulator 7 is shorter than that through the series connection of decimation filter 3 and modulator 4. Just by the fact that instead of six register banks, one only needs two, one sees the savings potential of the approach from FIG. 5.

If one assumes that an output signal $y\_j$ is essentially linearly dependent upon an input signal $x\_j$ (for i=j) and has only insignificant non-linear disturbances as a function of all input signals $x\_i$, where $i=1, \ldots, N$, it is possible to markedly reduce the memory requirements of characteristics-map memory 2, by producing a linear bypass branch 16 past characteristics-map memory 2. This is depicted schematically in the block diagram in FIG. 7. Each bypass branch 16 includes a multiplication by a fixed factor and an addition of a fixed offset value (see FIG. 8). The sequence of multiplication and addition may be selected as desired; however, because of the word lengths occurring, the version with the multiplication prior to the addition has advantages with regard to the expenditure connected therewith. For the adjustment of sensor 8, the factor and the offset value must likewise be stored in a non-volatile memory. In order to properly scale the dynamics of the non-linear characteristics-map data, prior to the addition to the bypass data of word length $n\_6,j$, the multiplication by a hard-wired factor j (blocks 17 in FIG. 7) is necessary. As a rule, this will only be a binary shift operation.

Thus, characteristics-map memory 2 contains only those interpolation points of characteristics map 13 which are needed for a non-linear fine adjustment of $y\_j$ as a function of $x\_i$, and for the dependencies of $y\_j$ on $x\_i$, where i is not equal to j. Therefore, $n\_4,j$, and thus the size of characteristics-map memory 2, may be selected to be smaller for the specific embodiment in FIG. 7 than for the implementation without bypass branches 16 (e.g. FIG. 3 or 5).

In the schematic block diagrams (FIGS. 3, 5 and 7), simple scaling and limiting functions, which are necessary or useful in practice, were not shown for reasons of clarity. Thus, for, example, downstream of delta-sigma A/D converter 1, a rough offset- and sensitivity preadjustment is useful, in order to better utilize characteristics map 13.

What is claimed is:

1. A method for correcting non-linearities of an electrical output signal of an electrical component with the aid of a characteristics map that is defined by discrete interpolation points and stored in a characteristics-map memory, comprising:

performing an A/D conversion of at least one analog signal influencing the non-linearities of the electrical output signal;

over-sampling the at least one analog signal;

shifting a quantization noise in the at least one analog signal out of a signal-frequency range toward higher frequencies, wherein the A/D conversion, over-sampling, and shifting is performed by a delta-sigma modulator;

addressing the characteristics-map memory storing the characteristics map using an output signal of the delta-sigma modulator;

ascertaining the interpolation points of the characteristics map that are adjacent as a function of the at least one analog signal which is used to address the characteristics map; and performing an interpolation between the ascertained adjacent interpolation points using a noise in the at least one analog signal based on the quantization noise to ascertain an output signal of the characteristics map.

2. The method as recited in claim 1, further comprising:

low-pass filtering to remove a large part of the quantization noise from the output signal of the characteristics map after the output signal of the characteristics map is ascertained.

3. The method as recited in claim 1, wherein:

the low-pass filtering is performed using a decimation filter.

4. The method as recited in claim 1, wherein:

the at least one analog signal is oversampled by a further delta-sigma modulator prior to addressing the characteristics map.

5. The method as recited in claim 1, further comprising:

using the output signal of the characteristics map as a corrected output signal of the electrical component.

6. The method as recited in claim 1, wherein the electrical component includes a measuring transducer.

7. A digital sensor evaluation circuit of an electrical component for correcting non-linearities of an electrical output signal of the electrical component, the evaluation circuit comprising:

a characteristics-map memory in which discrete interpolation points of a characteristics map are stored;

a delta-sigma modulator for A/D conversion of at least one signal affecting the non-linearities of the output signal of the electrical component, for oversampling the at least one signal, and for shifting a quantization noise in the at least one signal out of a signal-frequency range toward higher frequencies;

an arrangement for addressing the characteristics-map memory using an output of the delta-sigma modulator, and for addressing the characteristics map using the at least one signal;

an arrangement for ascertaining the interpolation points of the characteristics map that are adjacent as a function of at least one signal;

an arrangement for ascertaining an output signal of the characteristics map as a function of the at least one signal by an interpolation between interpolation points of the characteristic map using a noise of the at least one signal based on the quantization noise; and an arrangement for correcting the output signal of the electrical component as a function of the output signal of the characteristics map.

8. The digital sensor evaluation circuit as recited in claim 7, wherein the electrical component includes a measuring transducer.

9. The evaluation circuit as recited in claim 7, further comprising:

a further delta-signal modulator for oversampling the at least one signal prior to addressing the characteristics map.

10. The evaluation circuit as recited in claim 7, further comprising:

a low-pass filter arrangement for removing a large part of the quantization noise of the output signal of the characteristics map.

11. The evaluation circuit as recited in claim 10, wherein the low-pass filter arrangement includes:

a decimation filter.

12. The evaluation circuit as recited in claim 7, further comprising:

an arrangement for correcting the output signal of the electrical component using the output signal of the characteristics map.

13. A measuring transducer for converting one of physical quantities and chemical quantities, detected by a sensor, into an electrical output signal, comprising:

a digital sensor evaluation circuit for correcting non-linearities of an the electrical output signal, the evaluation circuit including:

a characteristics-map memory in which discrete interpolation points of a characteristics map are stored, a delta-sigma modulator for A/D conversion of at least one signal affecting the non-linearities of the electrical output signal, for oversampling the at least one signal, and for shifting a quantization noise in the at least one signal out of a signal-frequency range toward higher frequencies, an arrangement for addressing the characteristics-map memory using an output of the delta-sigma modulator, and for addressing the characteristics map using the at the least one signal, an arrangement for ascertaining the interpolation points of the characteristics map that are adjacent as a function of at least one signal, an arrangement for ascertaining a corresponding correction signal as a function of the at least one signal by an interpolation between interpolation points of the characteristic map using a noise of the at least one signal based on the quantization noise, and an arrangement for correcting the output signal of the electrical component as a function of the output signal of the characteristics map.

14. A storage medium for storing a computer program that when executed on a computing element achieves a performance of:

performing an A/D conversion of at least one analog signal influencing the non-linearities of the electrical output signal;

over-sampling the at least one analog signal;

shifting a quantization noise in the at least one analog signal out of a signal-frequency range toward higher frequencies, wherein the A/D conversion, over-sampling, and shifting is performed by a delta-sigma modulator;

addressing the characteristics-map memory storing the characteristics man using an output signal of the delta-sigma modulator;

ascertaining the interpolation points of the characteristics map that are adjacent as a function of the at least one analog signal which is used to address the characteristics map; and performing an interpolation between the ascertained adjacent interpolation points using a noise in the at least one analog signal based on the quantization noise to ascertain an output signal of the characteristics map; and correcting the output signal of the electrical component as a function of the output signal of the characteristics map.

15. The storage medium according to claim 14, wherein:
the computing element includes a microprocessor.

* * * * *